US010496852B1

(12) United States Patent
Marimuthu

(10) Patent No.: US 10,496,852 B1
(45) Date of Patent: Dec. 3, 2019

(54) SYSTEMS AND METHODS OF DYNAMIC OBFUSCATION PATTERN GENERATION FOR PREVENTING SMUDGE ATTACKS ON TOUCH SCREEN DEVICES

(71) Applicant: Symantec Corporation, Mountain View, CA (US)

(72) Inventor: Venkadesan Marimuthu, Chennai (IN)

(73) Assignee: SYMANTEC CORPORATION, Mountain View, CA (US)

(*) Notice: Subject to any disclaimer, the term of this patent is extended or adjusted under 35 U.S.C. 154(b) by 318 days.

(21) Appl. No.: 15/208,478

(22) Filed: Jul. 12, 2016

(51) Int. Cl.
*G06F 21/83* (2013.01)
*G06F 21/84* (2013.01)
*G06F 3/0488* (2013.01)

(52) U.S. Cl.
CPC .............. *G06F 21/83* (2013.01); *G06F 21/84* (2013.01); *G06F 3/04883* (2013.01)

(58) Field of Classification Search
CPC ....... G06F 21/83; G06F 3/04833; G06F 21/84
See application file for complete search history.

(56) References Cited

U.S. PATENT DOCUMENTS

| 8,174,503 | B2 * | 5/2012 | Chin | G06F 21/32 345/156 |
| 8,504,842 | B1 * | 8/2013 | Meacham | G06F 3/0488 713/182 |
| 8,800,026 | B2 * | 8/2014 | Tamaki | G06F 3/04883 345/156 |
| 8,925,071 | B2 * | 12/2014 | Ramu | G06F 21/36 726/16 |
| 9,158,907 | B2 * | 10/2015 | Meacham | G06F 3/0488 |
| 9,514,297 | B2 * | 12/2016 | Williams | G06F 21/36 |

(Continued)

FOREIGN PATENT DOCUMENTS

KR 20150006980 A * 1/2015 ............ G06F 21/36

OTHER PUBLICATIONS

Jun. 2, 2011 AndroidPolice.com (Summerson): https://www.androidpolice.com/2011/06/02/new-app-whispercore-prevents-smudge-attacks-on-android-phones-with-the-sacrifice-of-convenience-that-is/ (Year: 2011).*

(Continued)

*Primary Examiner* — Sharon S Lynch
(74) *Attorney, Agent, or Firm* — Maschoff Brennan

(57) ABSTRACT

Systems and methods for dynamic guided obfuscation pattern generation for preventing smudge attacks on touch screen devices are provided. One method may include receiving a user access pattern associated with a matrix displayed on the user interface; wherein, the system generates an obfuscation pattern based upon the user access pattern. For example, the system may generate edges of the obfuscation pattern by determining potential lines that may be drawn from the first and last points of the user access pattern, which are non-repeating and non-overlapping with any edges of the user access pattern and any edges of the obfuscation pattern. The system may iteratively generate edges until a predetermined number of edges are generated or no more edges can be drawn meeting the requirement. Further, the system may display the obfuscation pattern in a point by point or edge by edge fashion on the user interface, enabling the user to draw the new pattern that disguises the user's original access pattern.

20 Claims, 7 Drawing Sheets

(56) References Cited

U.S. PATENT DOCUMENTS

| | | | | |
|---|---|---|---|---|
| 9,558,491 | B2* | 1/2017 | Edwards | G06Q 20/382 |
| 9,582,653 | B2* | 2/2017 | Franke | G06F 21/36 |
| 9,589,120 | B2* | 3/2017 | Samuel | G06F 21/32 |
| 9,606,650 | B2* | 3/2017 | Li | G06F 3/04883 |
| 9,613,356 | B2* | 4/2017 | Edwards | H04L 9/3226 |
| 10,007,771 | B2* | 6/2018 | Oguz | G06K 9/00335 |
| 2002/0143957 | A1* | 10/2002 | Tanimoto | H04L 29/06 709/227 |
| 2004/0070602 | A1* | 4/2004 | Kobuya | G01C 21/36 715/738 |
| 2009/0284482 | A1* | 11/2009 | Chin | G06F 3/04883 345/173 |
| 2012/0252410 | A1* | 10/2012 | Williams | G06F 21/36 455/411 |
| 2013/0229367 | A1* | 9/2013 | Pinch | G06F 21/36 345/173 |
| 2014/0143696 | A1* | 5/2014 | Weng | G06F 3/04817 715/765 |
| 2014/0300554 | A1* | 10/2014 | Samuel | G06F 21/32 345/173 |
| 2017/0004294 | A1* | 1/2017 | Agrawal | G10L 17/24 |
| 2017/0169199 | A1* | 6/2017 | Clarke | G06F 21/31 |
| 2017/0249610 | A1* | 8/2017 | Ferrer | G06F 21/10 |
| 2018/0019878 | A1* | 1/2018 | Jiang | H04L 9/32 |
| 2018/0373901 | A1* | 12/2018 | Wang | G06F 1/1626 |

OTHER PUBLICATIONS

2009 YouTube Video Unlock Pattern of Android Phone (Budwonlee). (Year: 2009).*

Emanuel von Zerschwitz et. al, Making Graph-Based Authentication Secure against Smudge Attacks, Proceedings of the International Conference on Intelligent User Interfaces 277-286 (2013).*

Stefan Schneegass et. al, Smudgesafe: Geometric Image Transformations for Smudge-Resistant User Authentication, Proceedings of the 2014 ACM International Joint Conferenceon Pervasive and Ubiquitous Computing 775-786 (2014).*

Machine Translation of KR 20150006980(A) by EPO and Google (obtained Jan. 3, 2019).*

Official USPTO Human Translation of Kyoung (KR 2015/0006980) (Pub. Jan. 20, 2015) (translated May 2019).*

Dye, Eric; "Smudge Attacks! (Smartphone Touch Screen Security)", Jun. 3, 2011.

Gordon, Whitson; "WhisperCore Clears the Finger Smudges from Your Phone's Screen for Increased Security", Jun. 1, 2011. http://lifehacker.com/5807560/whispercore-clears-the-finger-smudges-from-your-phones-screen-for-increased-security.

Uz, Ali Servet; "The effectiveness of remote wipe as a valid defense for enterprises implementing a BYOD policy", 2014. https://www.ruor.uottawa.ca/bitstream/10393/30373/3/%20Uz_Ali_2014_thesis.pdf.

Miller, Tessa; "What's the Best Way to Prevent Touch Screen Smudge Attacks?", Jul. 12, 2013. http://lifehacker.com/whats-the-best-way-to-prevent-touch-screen-smudge-atta-757563408.

Chiang, Hsin-Yi; "A Graphical Password Scheme for Mobile Devices", Jan. 2013. https://www.scs.carleton.ca/sites/default/files/thesis_repository/HSIN_Yi_Chiang_MCS_Winter_2013.pdf.

Aviv, Adam J.; Gibson, Katherine; Mossop, Evan; Blaze, Matt; Smith, Jonathan M.; "Smudge Attacks on Smartphone Touch Screens". http://www.perfectclean.com/pdf/SMUDGE_ATTACKS.pdf, (2010).

Information Security Stack Exchange, "Touch Screen Password Guessing by Fingerprint Trace", http://security.stackexchange.com/questions/36030/touch-screen-password-guessing-by-fingerprint-trace, (2013).

* cited by examiner (1)  (2)

(1)  (2)

(1)

(2)

(3)

(4)

(5)

(6)

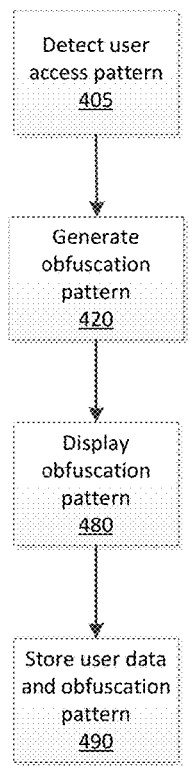
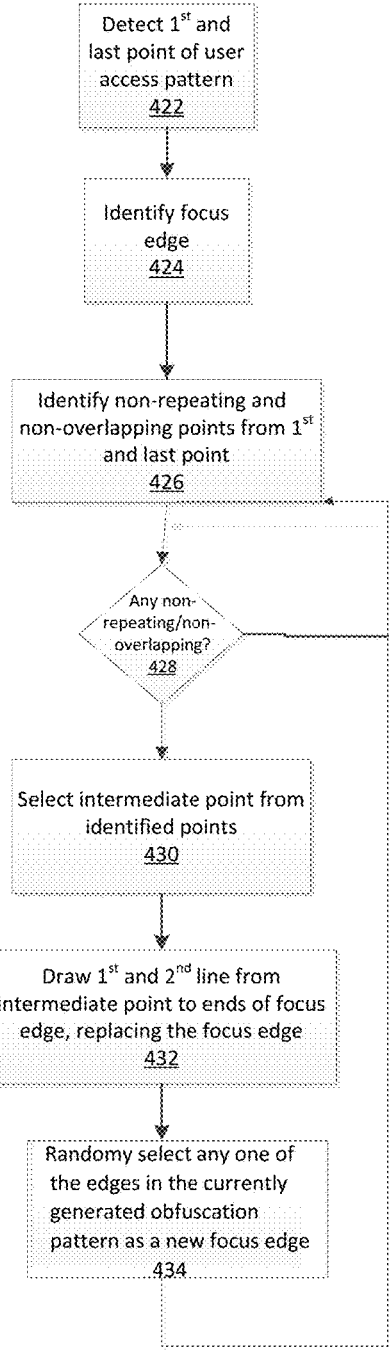
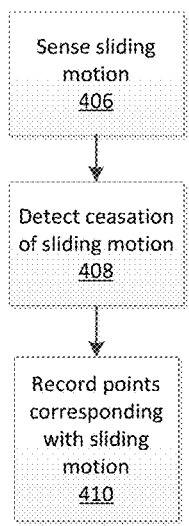
FIG. 4A
FIG. 4B
FIG. 4C

SYSTEMS AND METHODS OF DYNAMIC OBFUSCATION PATTERN GENERATION FOR PREVENTING SMUDGE ATTACKS ON TOUCH SCREEN DEVICES

BACKGROUND

As one of the many security features of a mobile device, a self-locking feature enables the mobile device to enter into a locked state when it is not in use for some predetermined amount of time. In the alternative, the device may enter into the lock state when a user provides an input that causes the computing device to enter the locked state. For example, a computing device may lock when the user actuates a lock button on the user screen. In the alternative, the lock state may occur when the system detects a predetermined amount of time has passed since the user has provided input to the device. Among various types of authentication, pattern-based authentication for unlocking the user interface is a popular mechanism for many touchscreen mobile devices. Touchscreens are an increasingly common feature on most personal computing devices, especially smart phones, where size and user interface advances accrue from consolidating multiple hardware components (keyboard, number pad, etc.) into a single software definable user interface. For example, Google's Android® mobile device implements the use of pattern-based authentication for its smart phone product line. The patterns are usually drawn as a sequence of lines connecting a unique set of points in N*N matrix. Once the user has become familiar with the pattern, his brain subconsciously remembers the pattern, which effortlessly enables the user to swipe the screen with this user access pattern. This is what makes pattern based authentication so user friendly. The whole idea behind the marketing of pattern based authentication is that users do not need to "think" in order to draw their authentication pattern, which is the reason for its popularity.

Pattern-based authentication, however, has a serious security issue. As the user swipes his finger across the user interface, oily residues, or smudges, on the touchscreen surface exist. When the mobile device is tilted at some position or angle, the smudge marks which result from drawing the user access pattern on the user interface of the mobile device can be highly visible particularly when the pattern is used frequently and does not change or when no other user actions/swipes are carried out after a successful screen unlock of the mobile device.

This makes it easy for hackers to guess the actual user access pattern using simple cameras and image processing software. In some cases, the user access pattern may be seen using the naked eye. This activity is commonly referred to as a "smudge attack." Under proper lighting and camera settings, the finger smudges can be easily detected and the heaviest smudges can be used to infer the user input pattern (user access pattern). Therefore, it is important to prevent smudge attacks on mobile devices having touchscreen features.

Some conventional mobile devices may provide a feature including changing the orientation of the N*N matrix in an effort to prevent a smudge attack. In the alternative, some devices may alert the user to wipe the screen after unlock in the device. Other devices use a numeric pad for unlock the device. Randomly positioned colors on a color wheel, where the user is solicited to select the colors randomly, is another solution to work around a smudge attack. Alternatively, the user may be solicited to select randomly positioned pictures or a custom pattern within the grid. Where these solutions fail is that all of the above solutions require a user to think every time the unlock user interface appears. Researchers have found that users find these difficult and, as a result, the user often provides an incorrect pattern. Consequently, these solutions may require the user to process through multiple attempts in an effort to authenticate successfully. It is within this context that the embodiments arise.

SUMMARY

Embodiments of a system and method for dynamic guided obfuscation pattern generation to prevent smudge attacks on touch screen devices are provided. It should be appreciated that the present embodiment can be implemented in numerous ways, such as a process, an apparatus, a system, a device, or a method. Several inventive embodiments are described below.

In some embodiments, a system and method for dynamic guided obfuscation pattern generation for preventing smudge attacks on touch screen devices is provided. In one embodiment, the method may include detecting a user access pattern associated with a matrix displayed on the user interface; wherein, the system generates an obfuscation pattern based upon the user access pattern. For example, the system may generate edges of the obfuscation pattern by determining potential lines that may be drawn from the first and last points of the user access pattern to an intermediate point, which are non-repeating and non-overlapping with any edges of the obfuscation pattern and user access pattern. In particular, the method may designate the first and last point of the user access pattern to be a focus edge. A line may be drawn from the first point of the focus edge to the intermediate point and another line may be drawn from the intermediate point to the last point. From the two lines drawn, the method may include selecting either line to be the new focus edge. The selection of the line may be predetermined or random. The method may include utilization of an algorithm for the selection of the focus edge. The system may iteratively generate edges until a predetermined number of edges are generated or no more edges can be drawn meeting the non-repeating and non-overlapping requirement. Further, the system may display the obfuscation pattern in a point by point (or edge by edge) fashion on the user interface, guiding the user to draw the new pattern that disguises the user's original access pattern. The method may also include storing the user access pattern and its associated obfuscation pattern either locally or remotely.

In some embodiments, a security system for prevention of a smudge attack is provided. The security system may include a processor coupled to memory to execute an obfuscation pattern generator scheme using within an input manager utility; wherein, the processor is operable to detect a user access pattern associated with a matrix on and unlock user interface. For example, the processor may sense a sliding motion across the unlock interface at predetermined points and record these predetermined points associated with the sliding motion to be the user access pattern when the user ceases the sliding motion for a predetermined period of time. The processor may also be operable to generate an obfuscation pattern based upon the user access pattern. For example, the processor may detect the first and last point of the user access pattern, setting a line between these two points to be a focus edge of the obfuscation pattern. Further, the processor may identify a first and second set of potential new points from the first and the last point of the user access pattern that are non-repeating and non-overlapping with the focus edge, any edges of the user pattern. The processor may select an intermediate point that is common to the first and second set. The processor may further designate that two lines be drawn from the intermediate point to the endpoints of the focus edge. Further, the processor may choose either line to represent the next edge to be the focus edge in a predetermined or random fashion. In addition, the processor may iteratively generate edges until a predetermined number of edges are generated or no more edges can be drawn meeting the non-repeating and non-overlapping requirement. Finally, the processor may display the obfuscation pattern by highlighting the points of each focus edge in a point by point fashion, such that the user is guided through the swiping motion associated with the obfuscation pattern.

In some embodiments, a tangible, non-transitory, computer-readable media having instructions whereupon which, when executed by a processor, cause the processor to perform the dynamic guided obfuscation pattern generation method described herein. The method may include detecting a user access pattern associated with a matrix displayed on the user interface; wherein, the system generates an obfuscation pattern based upon the user access pattern. For example, the system may generate edges of the obfuscation pattern by determining potential lines that may be drawn from the first and last points of the user access pattern to an intermediate point, which are non-repeating and non-overlapping with any edges of the user pattern and any edges of the obfuscation pattern. In particular, the method may designate the first and last point of the user access pattern to be a focus edge. A line may be drawn from the first point of the focus edge to the intermediate point and another line may be drawn from the intermediate point to the last point. From the two lines drawn, the method may include selecting either line to be the new focus edge. The selection of the line may be predetermined or random. The method may include utilization of an algorithm for the selection of the focus edge. The system may iteratively generate edges until a predetermined number of edges are generated or no more edges can be drawn meeting the non-repeating and non-overlapping requirement. On each iteration, any one focus edge is randomly selected from the list of all edges in the currently generated obfuscation pattern. Further, the system may display the obfuscation pattern in a point by point fashion on the user interface, guiding the user to draw the new pattern that disguises the user's original access pattern. The method may also include storing the obfuscation pattern and its associated user access pattern either locally or remotely Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

FIG. 4A is a flow diagram of one embodiment of a method for dynamically generating obfuscation pattern for preventing smudge attacks, in accordance with some embodiments.

FIG. 4B is a flow diagram of a method for the detecting user access pattern step 405 of FIG. 4A, in accordance with some embodiments.

FIG. 4C is a flow diagram of a method for the generating obfuscation pattern step 420 of FIG. 4A, in accordance with some embodiments.

DETAILED DESCRIPTION

Figure 1:
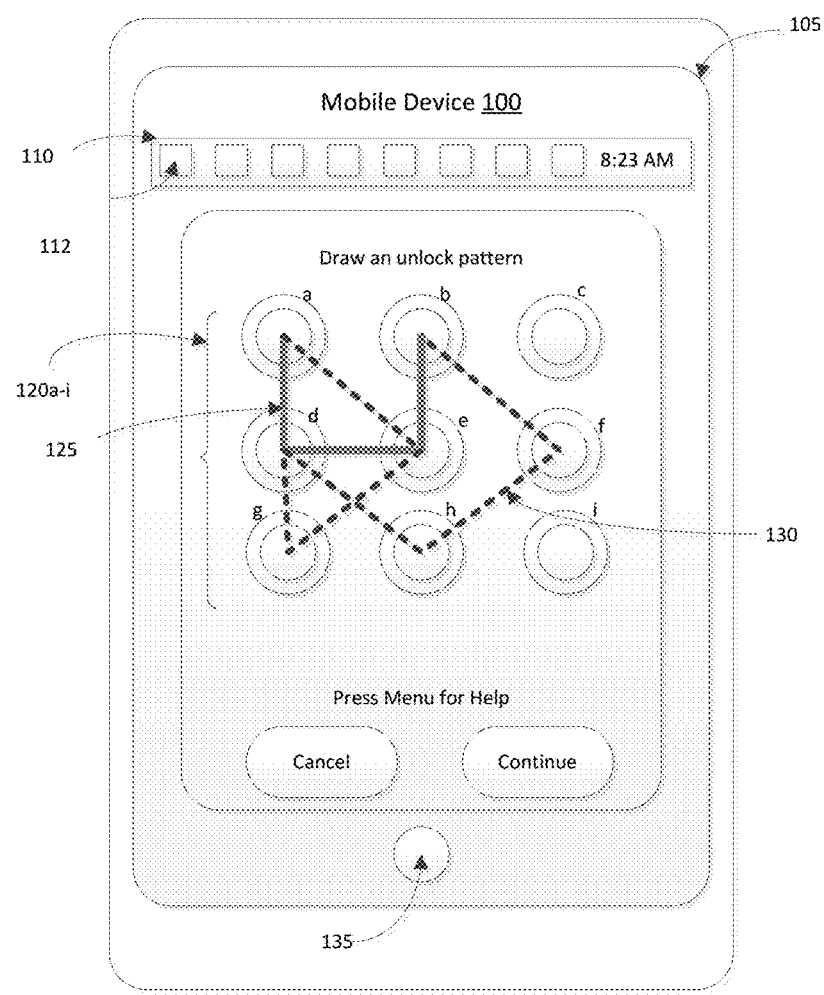
FIG. 1 is an overview of an example implementation of a mobile device having dynamic guided obfuscation pattern generation, in accordance with some embodiments.

The following embodiments describe systems and methods for dynamic guided obfuscation pattern generation. These systems and methods prevent smudge attacks in touch screen devices. It can be appreciated by one skilled in the art, that the embodiments may be practiced without some or all of these specific details. In other instances, well known process operations have not been described in detail in order not to unnecessarily obscure the embodiments.

In particular, the system and method for dynamic guided obfuscation pattern generation for preventing smudge attacks on touch screen devices may include detecting a user access pattern associated with a matrix displayed on the user interface; wherein, the system generates an obfuscation pattern based upon the user access pattern. For example, the method may include generating edges of the obfuscation pattern by determining potential lines that may be drawn from the first and last points of the user access pattern to an intermediate point, which are non-repeating and non-overlapping with any edges of the user pattern and any edges of obfuscation pattern. In particular, the method may designate the first and last point of the user access pattern to be a focus edge. A line may be drawn from the first point of the focus edge to the intermediate point and another line may be drawn from the intermediate point to the last point. From the two lines drawn, the method may include selecting either line to be the new focus edge. The selection of the line may be predetermined or random. The method may include utilization of an algorithm for the selection of the focus edge. The system may iteratively generate edges until a predetermined number of edges are generated or no more edges can be drawn meeting the non-repeating and non-overlapping requirement. Further, the system may display the obfuscation pattern in a point by point fashion on the user interface, guiding the user to draw the new pattern that disguises the user's original access pattern. The method may also include storing the obfuscation pattern and its associated user access pattern either locally or remotely. Further, the method may include storing the user access pattern and all obfuscation patterns associated with the user access pattern. In this case, the system avoids the time necessary to generate an obfuscation pattern generation, where one obfuscation pattern is randomly selected from one of the saved obfuscation patterns. For this embodiment, the obfuscation patterns can be regenerated and updated in data store, whenever the user access pattern is changed by the user.

The generated obfuscation pattern includes a set of untouched edges from the unlock user interface matrix, which are based upon an actual user pattern. The system may guide the user to draw the obfuscation pattern immediately after actual authentication of the actual user pattern by displaying the edges one by one. The obfuscation pattern generated using the methods disclosed herein can be drawn effortlessly without lifting a finger. Accordingly, the additional smudge marks resulting from the obfuscation pattern make it difficult to guess the actual user access pattern, thus preventing smudge attacks. The user access pattern starts from an originating point and ends at a destination (last) point by going over at least two other intermediary points where points and edges in the pattern are unique. The efficiency of the methods included herein resolve from generating the obfuscation pattern connecting unused edges which starts from the user pattern's origin point and ends with the user pattern's destination point forming a closed loop. Additionally, the security system may override the default lock screen with a custom implementation to save the user access pattern and generate obfuscation pattern displaying them immediately after successful screen unlock. The system may generate and save all possible obfuscation patterns and randomly select one of these.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary embodiment of a mobile device 100 having dynamic guided obfuscation pattern generation is shown. The device 100 includes a touchscreen display 105 having a selection button 135 for various selectable features associated with applications program on the mobile device 100. Although device 100 is a mobile device, a similar touchscreen may be used on other types of computing devices, such as a tablet computer, a touch-enabled computer monitor, a dedicated electronic device (i.e. a radio, e-reader, or power meter), or a toy with a touchscreen. The touchscreen display 105 can receive touch input from a user which may include the use of one or more fingers tapping, sliding, holding, or otherwise interacting with the touchscreen 105. Some touchscreens are configured to receive input from a stylus or other device, either in addition to or as an alternative to user touch input. The computing device containing the touchscreen 105 can receive other forms of input and output using components that include hardware buttons, a scroll-ball, a power button, a speaker, an additional touchscreens.

Touchscreen 105 can display a welcome screen as shown to the user. This welcome screen may include the unlock user interface having a status bar 110 and an unlock panel having a matrix of points 120*a-i*. The status bar 110 includes notification icons 112 from various utilities. For example, the status bar may include notification of a calendar event, an unread mail, an unread message, power, Wi-Fi status, Bluetooth status, date, time, and the like. The unlock user interface communicates to the user that the computing device is in an unlock state, which may have occurred as a result of a period of time associated with non-activity or the user may have actuated a soft or hard button (i.e. implemented in software or hardware). The user access pattern 125 may be drawn without breaks from point to point (120 *a-i*). In some embodiments, the mechanism for unlocking the computing device 100 may include a matrix of interactive elements or points 120*a-i*, wherein user input is received as it is drawn in a password shape through those interactive elements. For example, when the user touches the first interactive element, the element may respond by lighting up and vibrating the device 100. The user may then draw a line through other interactive elements by sliding the finger over other interactive elements to form the user access pattern. A path line or other UI element may track the user's movements, displaying the user access pattern as it is entered. Lifting the finger from the touchscreen 105 may indicate that the user access pattern is complete. As shown, the user access pattern 125 is drawn through points 120*a*, 120*d*, 120*e*, and 120*b*. The system may generate an obfuscation pattern 130 and display this pattern in an edge by edge fashion. As shown, the obfuscation pattern 130 represents the dashed line drawn through points 120*a*, 120*e*, 120*g*, 120*d*, 120*h*, 120*i*, 120*f*, and 120*b*. In particular, after the system has generated the obfuscation pattern 130, a display manager may light up the first point 120*a* of the obfuscation pattern 130, causing it to blink, while lighting up the second point 120*e* of pattern 130. In this way, the system guides the user to place a finger on the first point and slide it to the second point. When the system senses user actuation of the surface and the sliding motion, the system may light up the third point 120*g* and, so on, until all points of the pattern 130 have been lit. In this fashion, the system may guide the user through the entire obfuscation pattern, disguising the original user access pattern. Alternatively, the system may blink or light up edges 120a-e, 120e-g, 120g-d, and so on instead of highlighting the points.

Figure 2:
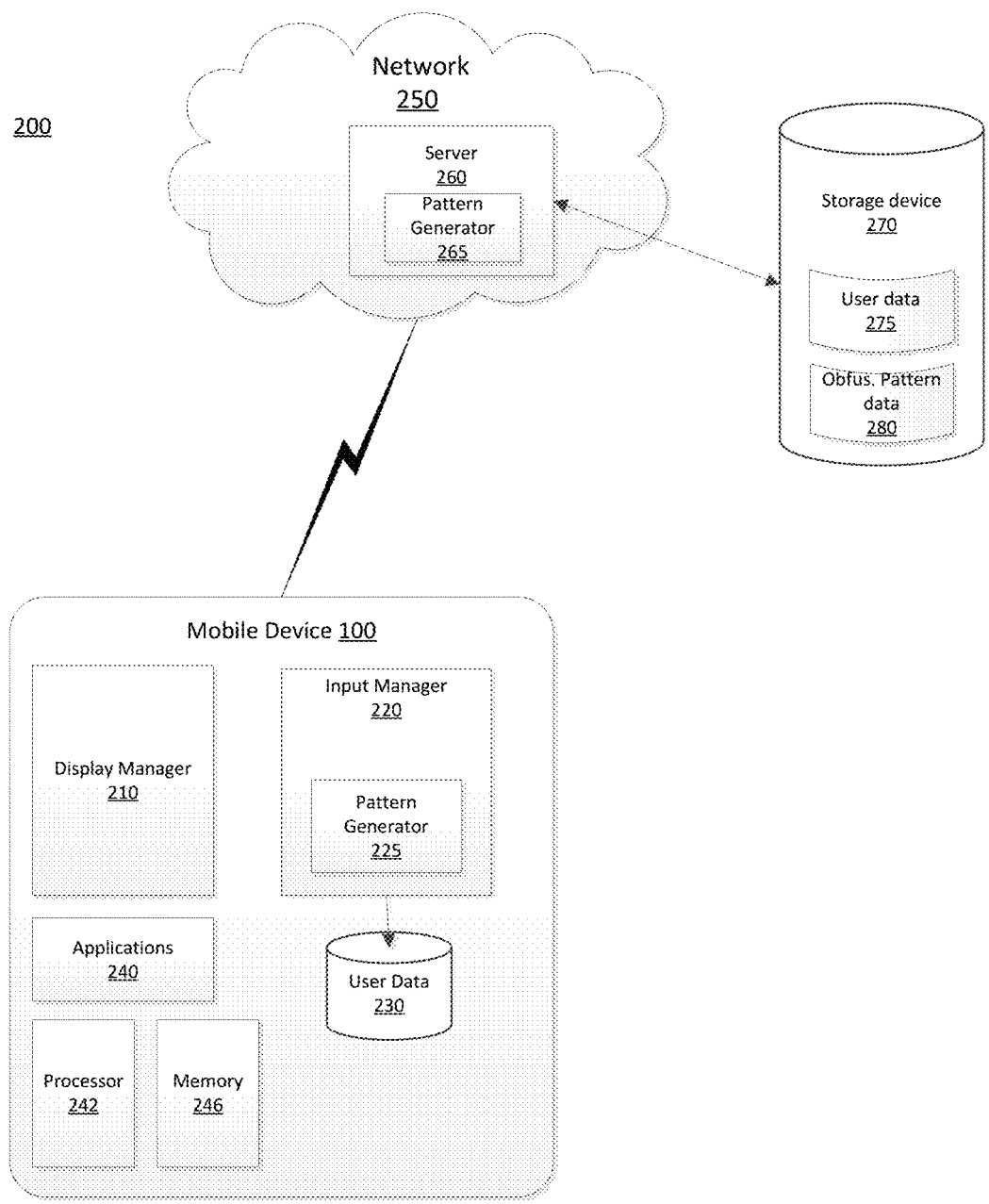
FIG. 2 is a system diagram of a mobile device system having dynamic guided obfuscation pattern generation, which can use one or more of the mobile devices of FIG. 1 as a communication resource in some embodiments.

Referring to FIG. 2, system diagram of a mobile system having dynamic guided obfuscation pattern generation, in accordance with some embodiments is shown. The system 200 includes at least one mobile device 100, a network 250, at least one server 260, and a storage device 270. In general, the system 200 may include components, such as software stored on magnetic, optical, or other media and operating on one or more processors in the mobile device 100. As shown in FIG. 1, the mobile device may have a touchscreen display for displaying graphics as a part of a graphical user interface, and for receiving input from a user of the mobile device 100. In addition, the mobile device 100 may include a number of hardware buttons including a clickable scrolling button 135, that can be programmed to receive other user input including input that is coordinated with the display of FIG. 1.

A number of components stored on, and operating on, device 100 are shown schematically that may provide the functionality of locking and unlocking the touchscreen display 105 from receiving input. For example, the display 105 may be controlled by a display manager 210 that manages various visual elements that are to be shown to a user on the display 105, while an input manager 220 manages inputs received from the display 105 or from other mechanisms such as a trackball (not shown). In particular, the input manager 220 includes a pattern generator 225, which enables manager 220 to dynamically generate an obfuscation pattern from the user access pattern that it senses. In response, the display manager 210 in cooperation with the input manager 220 may guide the user to draw obfuscation pattern after a successful user pattern unlock.

The display manager 210 may receive graphic-related content from a number of sources and may determine how the content is to be provided to a user on the display 105. For example, when a number of different windows associated with various applications 240 of the device 100 may need to be displayed, the display manager 210 may determine which application to display. Further, the display manager 210 may determine when to hide an application or the content of the display window associated with the application. Additionally, the display manager 210 may detect when overlapping occurs between various graphical objects and organize the display in accordance with the detected overlap. The display manager 210 may be implemented, for example, by software operating on a microprocessor 242 (stored in memory 246) and/or on a dedicated graphics processor (not shown) with associated software and firmware. For this particular embodiment, display manager 210 may receive the graphic content associated with the unlock user interface to be displayed on display 105.

The input manager 220 may be responsible for translating commands provided by a user of device 100. For example, such commands may come from a keyboard, touchscreen display 105, clickable scrolling ball 135, or any other source, including dedicated hardware buttons or soft buttons (e.g. buttons whose function may change over time, and whose functions may be displayed on areas of display 105 that are adjacent to the particular buttons). The input manager 220 may determine, in what area of the display the commands are being received, and thus the application being shown on the display for which the commands are intended. In addition, input manager 220 may interpret input motions on the touchscreen 105 into a common format and pass those interpreted motions (e.g. short press, long press, multiple press, straight-line drag, and multi-touch inputs) to the appropriate application. For example, when the user applies pressure to the touchscreen in an area associated with one of the points the matrix 120 and slides his finger across one or more of the points, 120a-i, the input manager 220 senses the sliding motion in captures the associated points. The pattern generator 225 retrieves these captured points and uses the method described herein to dynamically generate an obfuscation pattern based upon the user access pattern. The input manager 220 may also report such inputs to an event manager (not shown) that in turn reports them to the appropriate modules or applications. For example, after the obfuscation pattern is generated, the event manager may report the user access pattern and its associated obfuscation pattern to a server 260. Also, the user access pattern and its associated obfuscation pattern may be stored in database 230 or storage device 270. Since the user pattern is not changed often, the user pattern may be saved once and need not be sensed every time during pattern unlock. The saved user pattern may be changed, or updated only when the user changes the user pattern using change pattern unlock screen in some embodiments. Based on the saved user pattern, if the pattern unlock is successful, the system may generate a corresponding obfuscation pattern in real-time or select one of the previously generated and saved obfuscation patterns.

Mobile device 100 having a local data store 230 may be coupled by a network 250 to the server 260 having its own pattern generator module 265. The server 260 may couple to the storage device 270 for reference to prior obfuscation patterns. Each mobile device 100 may include a display manager 210, input manager 220, applications 240, memory 246, a processor 242, and local data store 230. Applications 240 may be comprised of operating systems, database applications, e-mail applications, and virtual machines, productivity applications, browser applications, and the like. In some embodiments, the pattern generator 225 may serve as a device that communicates with the display manager 210 to perform the method of dynamic obfuscation pattern generation described more in detail below. In other embodiments, the pattern generated 265 located on server 260 may communicate with mobile device 100 and generate obfuscation pattern based upon the user access pattern, serving as the sole agent that performs the method of dynamic obfuscation pattern generation described herein. The mobile device 100, server 260, and the storage device 270 may reside on the same LAN, or on different LANs that may be coupled together through the Internet, but separated by firewalls, routers, and/or other network devices. In one embodiment, one or more mobile devices 100 may couple to server 260 through a mobile communication network 250. In another embodiment, the mobile devices 100, server 260, and the storage device 270 may reside on different networks. In some embodiments, the server 260 may reside in a cloud network, as shown. Although not shown, in various embodiments, the mobile device 100 may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

The server 260 may comprise a processor (not shown), memory (not shown), and pattern generator 265. In some embodiments, the system 200 may comprise processing software instructions and/or hardware logic required for dynamic obfuscation pattern generation according to the embodiments described herein. The server 260 may provide remote cloud storage capabilities for all obfuscation patterns associated with user access patterns, through the storage device 270 coupled by network 250. Further, these may couple to one or more tape-out devices (not shown) or any other secondary datastore. As such, a database of user access pattern and associated obfuscation pattern data may be stored within a local data store, remote disks, secondary data storage devices, or tape-outs devices (not shown). The local data store may represent a single or multiple data structures (databases, repositories, files, etc.) residing on one or more mass storage devices, such as magnetic or optical storage based disks, tapes or hard drives. Further, the server 260 may communicate with the remote storage devices over a public or private network. Although not shown, in various embodiments, the server 260 may be a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like.

Figure 3A:
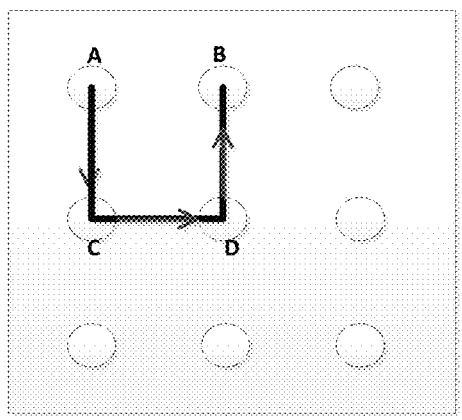
FIG. 3A is an unlock user interface having a user access pattern mapped over an N×N matrix and the associated smudge pattern, in accordance with some embodiments.
Figure 3A:
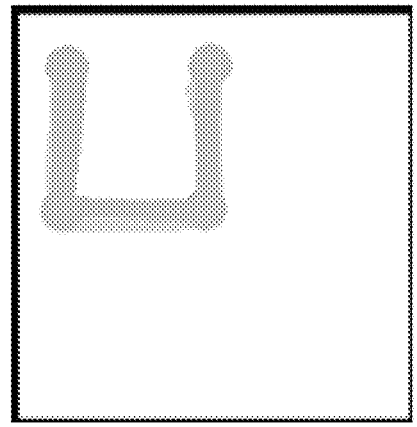
Figure 3B:
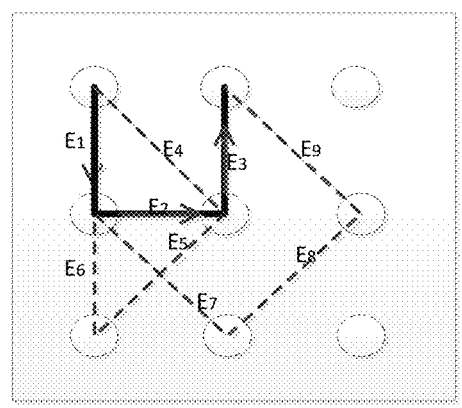
FIG. 3B is the unlock user interface having both the user access pattern and an obfuscation pattern drawn over the matrix and the associated smudge pattern for both, in accordance with some embodiments.
Figure 3B:
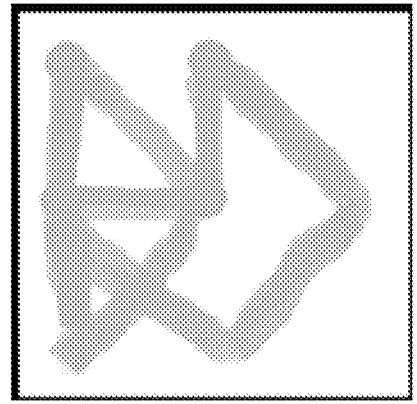

In operation, one embodiment of a method for dynamically generating obfuscation pattern for preventing smudge attacks may include detecting the user access pattern by security system 200. In particular, display manager 200 may display the unlock interface on the touchscreen of the mobile device 100 and wait for the user to actuate the touch sensitive screen with his finger. Input manager 220, may translate the commands provided by the user through the touchscreen display 105. For example, input manager 200 may sense which interactive element(s) the user has actuated using a sliding motion and identify the corresponding matrix point(s). Further, input manager 200 may translate each one of these actuated matrix point as the user access pattern. Input manager 200 may send the user access pattern to the pattern generator 225 that will generate an obfuscation pattern based upon the user access pattern. For example, FIG. 3A displays the unlock user interface having a user access pattern mapped over an N×N matrix and the associated smudge pattern, in accordance with some embodiments. As shown in FIG. 3A (1), the user access pattern transverse is through points A, C, D, and B. The smudge mark associated with this user access pattern is shown in FIG. 3A (2). The pattern generator 225, in this example, generates an obfuscation pattern based upon the user access pattern, as shown in FIG. 3B(1). FIG. 3B represents the unlock user interface having both the user access pattern and an obfuscation pattern drawn over the matrix and the associated smudge pattern for both, in accordance with some embodiments. In particular, the dotted line represents the obfuscation pattern that passes through and includes the following edges: E4, E5, E6, E7, E8, and E9. To the right, as shown in FIG. 3B(2), the smudge pattern associated with both the user access pattern and the obfuscation pattern disguises the user access pattern.

Input manager 200 may record the user access pattern and the obfuscation pattern either locally or remotely in a storage device. For example, the input manager 200 may store the user access pattern in data store 230. In the alternative, the input manager 200 may communicate with server 260 to store the user access pattern in storage device 270. The input manager 200 may also store the obfuscation pattern associated with the user access pattern in either data store 230 or storage device 270.

Figure 3C:
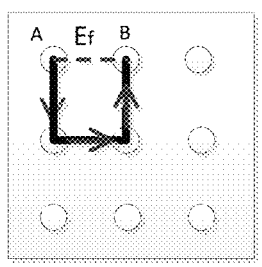
FIG. 3C illustrates how the obfuscation pattern is derived in a step-by-step fashion and mapped over the matrix, in accordance with some embodiments.
Figure 3C:
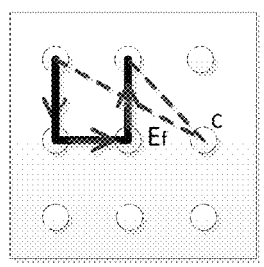
Figure 3C:
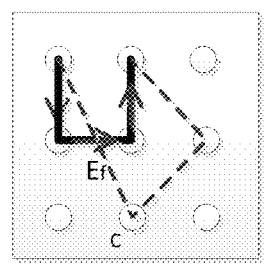
Figure 3C:
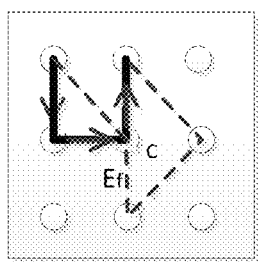
Figure 3C:
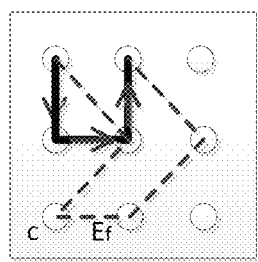
Figure 3C:
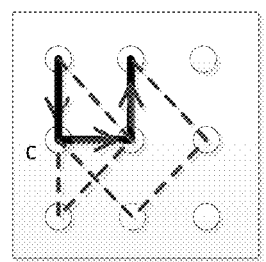

Regarding the pattern generation phase, pattern generator 225 may generate an obfuscation pattern based upon the user access pattern, such that a smudge left on the touch sensitive screen from the user access pattern is obfuscated. As shown, FIG. 3C illustrates how the obfuscation pattern is derived in a step-by-step fashion and mapped over the matrix, in accordance with some embodiments. For example, pattern generator 225 may detect the first and the last point of the matrix corresponding to the user access pattern. As shown in FIG. 3C(1), the first and the last point of the user access pattern are points A and B. The pattern generator 225 may identify the focus edge ($E_f$) to be the line that is drawn from the first point(A) to the last point (B). The pattern generator 225 may identify a first and second set of potential new points that may be drawn from either endpoint of the focus edge to form a line that is non-repeating and non-overlapping with the focus edge and any edges of the user pattern. For example, as shown, when the focus edge is a line between the first and last point of the user access pattern, a potential new point (intermediate point) must be a point from which a line may be drawn to either the first point of the user access pattern or the second point of the user access pattern that is non-repeating and non-overlapping with the focus edge and any edges of user pattern. Alternatively the pattern generator 225 may detect and choose the intermediate, which is common to both sets of the potential points. For this example, the selected intermediate point is point C in FIG. 3C(2). Proceeding further, pattern generator 225 may draw a line from the endpoints of the focus edge to the intermediate point. For example, as shown a line is drawn from endpoint A to intermediate point C and a second line is drawn from intermediate point C to endpoint B. Pattern generator 225 may select either line in a predetermined or random fashion. For example, the system may use a pseudo-random number generator to generate a random number for the random selection of the line. In particular, if the number of edges in obfuscation pattern generated so far is N, then a random number within the range of 1 to N is generated and appropriate line is picked as next focus edge (Ef). In the alternative, pattern generator 225 may use an algorithm to select the new focus edge. For this example, pattern generator 225 selects the line from endpoint A to intermediate point C to be the focus edge ($E_f$). Pattern generator 225 continuously detects a first and second set of potential points meeting the non-repeating and non-overlapping requirement for each focus edge ($E_f$) and chooses a line derived from an intermediate point in one of the endpoints of the focus edge ($E_f$) until a predetermined number of edges have been generated for the obfuscation pattern or no more points meet the non-repeating and non-overlapping requirement. As shown in FIG. 3C(3-6), pattern generator 225 processes through the steps of detecting a new focus edge ($E_f$) until all edges are completed for the obfuscation pattern as shown as the dotted line in FIG. 3C(6).

Figure 3D:
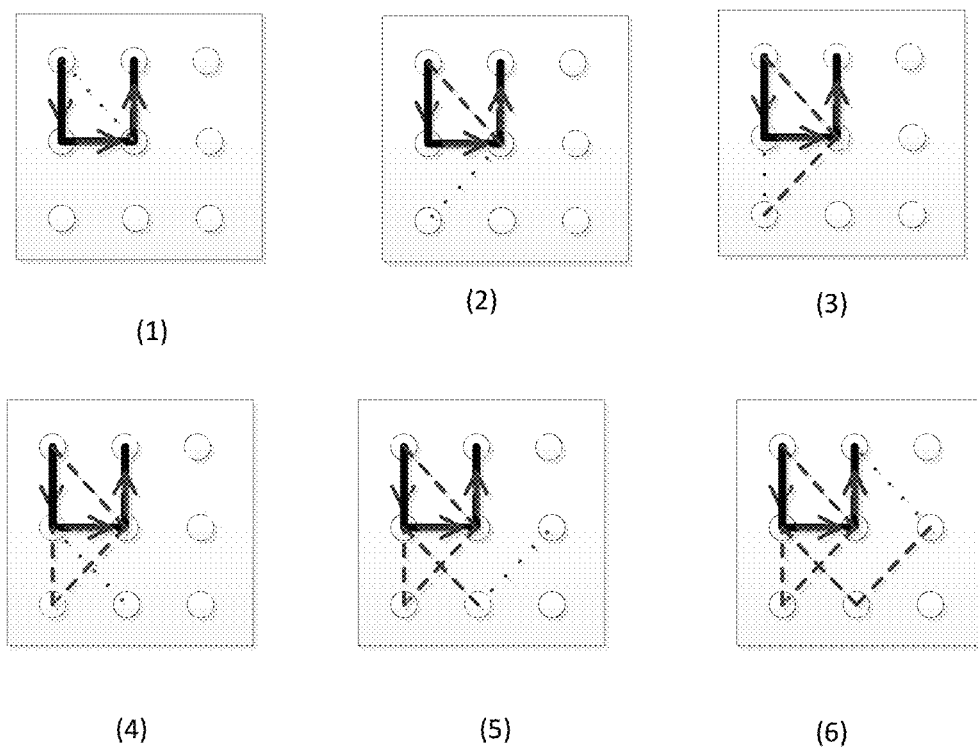
FIG. 3D shows how a user may be guided to draw the obfuscation pattern on the unlock user interface, in accordance with some embodiments.

Cooperating with the display manager 210, the pattern generator 225 may display the obfuscation pattern in a point by point fashion on the user interface, guiding the user to draw the new pattern that disguises the user's original access pattern. For example, FIG. 3D shows how a user may be guided to draw the obfuscation pattern on the unlock user interface, in accordance with some embodiments. After the user has drawn the user access pattern, pattern generator 225 may communicate the completed obfuscation pattern with display manager 210 for the display manager 210 to highlight the endpoints of the first edge of the obfuscation pattern using either an audio, visual, or tactile alert. As shown in FIG. 3D(1), display manager 210 may highlight the edge corresponding to the dotted line. After the user has actuated the highlighted edge using the touchscreen, the display manager 220 may highlight the endpoints of a second edge as shown in FIG. 3D(2). The display manager 220 proceeds to highlight each edge corresponding to every edge of the obfuscation pattern as shown in FIG. 3D (1-6) until the entire obfuscation pattern has been actuated by the user.

It is appreciated that the components of exemplary operating environment 200 are exemplary and more or fewer components may be present in various configurations. It is appreciated that operating environment may be part of a distributed computing environment, a cloud computing environment, a client server environment, and the like.

In other words, as would be apparent to one of ordinary skill in the art after reading this description, the various features and functionality described herein may be implemented in the security system using any arrangement components necessary to perform the dynamic obfuscation pattern generation and other security features (and functionality); and can be implemented in one or more separate or shared modules in various combinations and permutations.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

FIG. 4A is a flow diagram of one embodiment of a method for dynamically generating obfuscation pattern for preventing smudge attacks, in accordance with some embodiments. In an action 405, the security system 200 may detect a user access pattern. For example, as shown in FIG. 4B, which represents a flow diagram of a method for the detecting user access pattern step 405 of FIG. 4A, security system 200 may sense a sliding motion across the unlock interface at predetermined points of the matrix, in an action 406. When the user ceases the sliding motion, this is a signal to the system indicating the end of the user access pattern. Accordingly, in an action 408, the system 200 detects the cessation of the sliding motion for a predetermined time. These predetermined points corresponding to the sensed sliding motion may be recorded as the user access pattern either locally or remotely in a storage device (230, 270) in an action 410.

In an action 420, system 200 may generate an obfuscation pattern based upon the user access pattern, such that a smudge left on the touch sensitive screen from the user access pattern is obfuscated. For example, as shown in FIG. 4C, which represents a flow diagram of a method for the generating obfuscation pattern step 420 of FIG. 4A, security system 200 may detect the first and last point of the user access pattern in an action 422. The security system 200 may identify a focus edge in an action 424. For example, the initial focus edge may be interpreted as a line between the first point and the last point. In an action 426, the method may include identifying a first and second set of potential new points that may be drawn from either endpoint of the focus edge to form a line that is non-repeating and non-overlapping with the focus edge and any edges of the user pattern. In one example, code for detecting these potential points to avoid overlapping/repeating edges may include the following instructions:

```
public List<Point> getPossibleDestPoints(Point p){
    List<Point> posibleDestPoints = new ArrayList<Point> ( );
    for (int i= -p.getX( ); i <= -p.getX( ) + N -1; i++){
        for (int j = -p.getY( ); j <= -p.getY( ) + N -1; j++){
            if (Math.abs(i) % (N-1) == 0 && (Math.abs(j) %
            (N-1) == 0){
                continue;
            }
            possibleDestPoints.add(newPoint(p.getX( ) + i p.getY( ) +
            j));
        }
    }
    return possibleDestPoints;
}
```

In the above code, N is number of points row/column in N*N matrix displayed in unlock screen. Each point is represented as "Point(x,y)" when x represent row index ranging from 0 to N−1 and y represent column index ranging from 0 to N−1.

Selection of these potential points give precedence to unused points in the matrix based upon the points used for the user access pattern. One example of code for selection of the potential points may include the following instructions:

```
public List<Point> getSystemPatternPoints(List<Edge>
userPattern){
    List<Point >systemPatternPoints = new ArrayList<Point>( );
    for (Point point : allPoints){
        boolean isUnusedPoing = true;
        for (Edge userEdge : userPattern){
            if (userEdge.getStart( ).equals(point) //
                userEdge.getEnd( ).equals(point)){
                isUnusedPoint = false;
            }
        }
        if (isUnusedPoint){
            systemPatternPoints.add(point);
        }
    }
    for (Point point : allPoints){
        if (!systemPatternPoints.contains(point)){
            systemPatternPoints.add(point);
        }
    }
    return systemPatternPoints;
}
private boolean isEdgeFoundInPattern(Point start, Point mid,
Point end, List<Edge > pattern){
    return (pattern.contains(new Edge(start, mid)) //
        pattern.contains(new Edge(mid, start)) //
        pattern.contains(new Edge(mid, end)) //
        pattern.contains(new Edge(end, mid)));
}
```

In one exemplary embodiment, when the focus edge is a line between the first and last point of the user access pattern, a potential new point (intermediate point) must be a point from which two lines may be drawn, one connecting the first point of the user access pattern and another line connecting the second point of the user access pattern that is nonrepeating and non-overlapping with the focus edge and any edges of the user access pattern or currently generated obfuscation pattern. In a decision action 428, the method may include detecting whether an intermediate point exists for the given set of endpoints of the focus edge. When no intermediate points exists that meets the non-repeating and non-overlapping requirement, the process ends in action 436. When an intermediate point exists that meets this requirement, the method may include selecting one intermediate point in an action 430. In some embodiments, the selection may comprise choosing the intermediate point that is common to both sets and the focus edge. A first and second line may be drawn from the intermediate point to each end of the focus edge in an action 432. For example, as shown in FIGS. 1 and 3C, when the focus edge comprises matrix point 120*a* and 120*b*, as its primary and secondary endpoint, and the intermediate point is located at matrix point 120*f*, a first line will be drawn from matrix point 120*a* to matrix point 120*f* and a second line will be drawn from matrix point 120*f* to matrix point 120*b* and the focus edge (Ef) will be removed from the generated obfuscation pattern. Further, the method may include randomly selecting any one of the edges in the currently generated obfuscation pattern as a new focus edge in an action 434. The line may be selected in a predetermined or random fashion. For random selection, in one embodiment, the system may use a pseudorandom number generator to generate a random number. Based upon the random number generated, the system may select the line, which represents the next focus edge. For example, system 200 may select the second line including matrix points 120*f* and 120*b* as shown in FIG. 3C (2). The method may repeat these steps (428-434) of identifying non-repeating and non-overlapping points to determine a new focus edge until a predetermined number of edges are found or no more potential points exists that can form a line that meets the non-repeating and non-overlapping requirement. In one embodiment, the code for getting the system pattern from the user access pattern may include an algorithm that works by forming a loop between the start and end points of the user access pattern and then gradually increases the size of this loop by adding intermediate points between the two of them (as shown below):

```
public List<Edge> getSystemPattern(List<Edge> userPattern){
    final int MAX_EDGES = 6;
    //Get Points for System Pattern - all unused points first followed by other points
    List<Point> systemPatternPoints = getSystemPatternPoints(userPattern);
    //Form initial system pattern with just a single edge between start and end points
of userpattern
    List<Edge> system Pattern = new ArrayList<Edge>( );
    systemPattern.add(new Edge(userPattern.get(0).getStart( ),
        userPattern.get(userPattern.size( ) - 1).getEnd( )));
    Map<Point, List<Point>> possiblePointsMap = new HashMap<Point,
List<Point>>( );
    //Consider the first edge of system pattern and try adding an intermediate point to it.
    int i = 0;
    //Do until the systemPattern has maximum of 6 edges or no edge can be added
    while (systemPattern.size( ) <MAX_EDGES && i < systemPattern.size( )){
        Point start = systemPattern.get(i).getStart( );
        Point end = systemPattern.get(i).getEnd( );
        //System.out.println("start: " + start + ", end:" + end);
        List<Point> startDestPoints = possiblePointsMap.get(start);
        if (startDestPoints == null) {
            startDestPoints = getPossibleDestPoints(start);
        }
        List<Point> endDestPoints = possiblePointsMap.get(end);
        if (endDestPoints == null) {
            endDestPoints = getPossibleDestPoints(end);
        }
    Point addedPoint = null;
    //System.out.println(systemPatternPoints);
        for (Point systemPatternPoint : systemPatternPoints){
            //Find Common Destination Point
            if (startDestPoints.contains(systemPatternPoint) &&
                endDestPoints.contains(systemPatternPoint)){
                //If this edge not found in userPattern, then add it to systemPattern
                if(!isEdgeFoundInPattern(start, systemPatternPoint, end,
userPattern) &&
                    !isEdgeFoundInPattern(start,systemPatternPoint,end,
system Pattern)){
                    //remove the original edge & add two edges connecting
common point
                    ////System.outprintln("Removed: " + systemPattern.get(i));
                    systemPattern.remove(i);
                    systemPattern.add(i, new Edge(start, systemPatternPoint));
                    systemPattern.add(i+1, new Edge(systemPatternPoint,
end));
                    addedPoint = systemPatternPoint;
                    break;
                }
            }
        }
        //If no common point found, try next edge in the system pattern
        if (addedPoint == null){
            i++;
        }
        else {
```

```
        //The added intermediate point should never be considered again
        systemPatternPoints.remove(addedPoint);
      }
    }
  }
  return systemPattern;
}
```

Referring back to FIG. 4A, the method may include displaying the obfuscation pattern in an action 480. The system 200 may display the obfuscation pattern in a point by point (or edge by edge) fashion on the user interface, guiding the user to draw the new pattern that disguises the user's original access pattern. For example, in some embodiments, system 200 may display the obfuscation pattern in a point by point fashion on the user interface, guiding the user to draw the new pattern that disguises the user's original access pattern. In particular, the method may include highlighting a primary endpoint of the focus edge using any alert, such as audio, visual, and tactile. For example, the security system 200 may light up the portion of the screen and interactive element corresponding to a point in the matrix, while vibrating the phone or sending an audio signal alert. Further, the system 200 may verify actuation of the corresponding interactive element by the user's touch and proceed to highlight the secondary endpoint of the focus edge. Finally, in an action 490, the method may include storing the user access pattern and obfuscation pattern locally or remotely. For example, input manager 220 may store the user data and its associated obfuscation pattern in data store 230. In the alternative input manager 200 may communicate with server 260 to store the same data in storage device 270.

Figure 5:
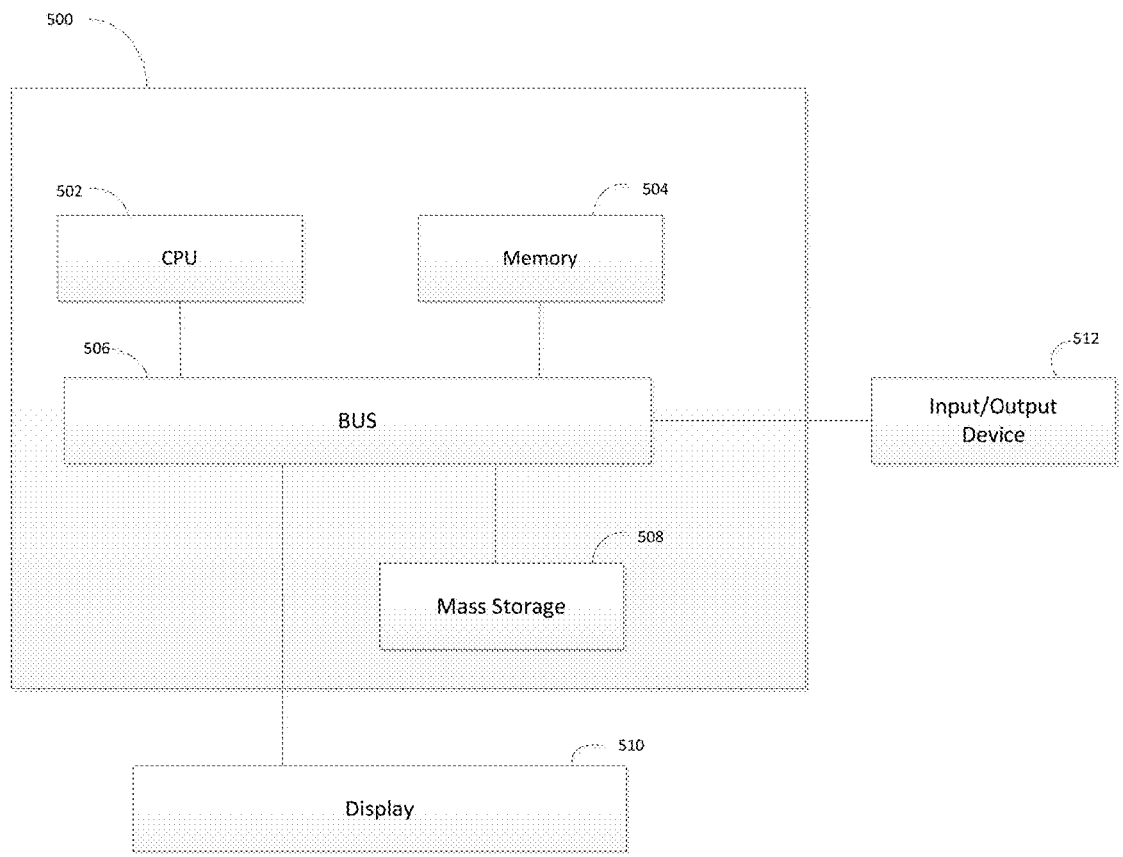
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for dynamic guided obfuscation pattern generation in accordance with some embodiments. The computing device includes a central processing unit (CPU) 502, which is coupled through a bus 506 to a memory 504, and mass storage device 508. Mass storage device 508 represents a persistent data storage device such as a floppy disc drive or a fixed disc drive, which may be local or remote in some embodiments. The mass storage device 508 could implement a backup storage, in some embodiments. Memory 504 may include read only memory, random access memory, etc. Applications resident on the computing device may be stored on or accessed through a computer readable medium such as memory 504 or mass storage device 508 in some embodiments. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some embodiments.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4C. The code embodying this functionality may be stored within memory 504 or mass storage device 508 for execution by a processor such as CPU 502 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of generating an obfuscation pattern for a touchscreen of a touchscreen device in order to obfuscate a smudge left on the touchscreen device, the method, comprising:

storing a user access pattern;
detecting entry of the user access pattern on a matrix displayed on an unlock interface of the touchscreen of the touchscreen device;
in response to determining that the user access pattern was entered correctly, unlocking the touchscreen and authenticating a user;
generating the obfuscation pattern, after the user access pattern is stored, that is different from the user access pattern but is based upon the user access pattern, the generating of the obfuscation pattern comprising:
  detecting a first point and a last point of the user access pattern; and
  including, in the obfuscation pattern, one or more lines connecting the first point to the last point, the one or more lines forming a closed loop between the first point and the last point of the user access pattern, at least one of the one or more lines not overlapping with any edge of the user access pattern;
displaying the obfuscation pattern on the touchscreen; and
detecting entry of the obfuscation pattern on the touchscreen to obfuscate a smudge left on the touchscreen from when the user was previously authenticated by entering the user access pattern on the touchscreen.

2. The method of claim 1, wherein the detecting entry of the user access pattern comprises:
  sensing a sliding motion across the unlock interface at predetermined points of the matrix;
  detecting a cessation of the sliding motion for a predetermined period; and
  recording the predetermined points corresponding to the sensed sliding motion as the user access pattern.

3. The method of claim 1, wherein the generating of the obfuscation pattern further comprises:
  interpreting a line between the first point and the last point to represent a focus edge of the obfuscation pattern;
  identifying a first set of potential new points from a primary point of the focus edge, wherein a line between any point of the first set and the primary point is nonrepeating and non-overlapping with the focus edge and any edges of the user access pattern;
  identifying a second set of potential new points from a secondary point of the focus edge, wherein a line between any point of the second set and the secondary point is non-repeating and non-overlapping with the focus edge and any edges of the user access pattern;
  selecting an intermediate point from the first set and the second set, wherein the intermediate point is common to the first and the second set;
  generating a first line from the primary point to the intermediate point and a second line from the intermediate point to the secondary point;
  replacing the focus edge with the first line or the second line as the focus edge; and
  repeating the identifying the first set, the identifying the second set, the selecting and the generating, until a predetermined number (N) edges are selected or no more potential points exist to generate a line that is non-repeating and non-overlapping with the focus edge, any edges of the user access pattern and any edges of the generated obfuscation pattern.

4. The method of claim 1, wherein the displaying of the obfuscation pattern comprises:
  highlighting a first edge of the generated obfuscation pattern;
  verifying that the first edge has been actuated by a touch of the user; and
  while all edges of the obfuscated pattern have not yet been verified as actuated, repeating the highlighting and the verifying for each successive edge of the obfuscation pattern.

5. The method of claim 1, wherein the generating of the obfuscation pattern further comprises:
  setting a line between the first point and the last point to represent a focus edge of the obfuscation pattern;
  identifying a first set of potential new points from a primary point of the focus edge, wherein a line between any point of the first set and the primary point is nonrepeating and non-overlapping with the focus edge and any edges of the user access pattern;
  identifying a second set of potential new points from a secondary point of the focus edge, wherein a line between any point of the second set and the secondary point is non-repeating and non-overlapping with the focus edge and any edges of the user access pattern;
  selecting an intermediate point from the first set and the second set, wherein the intermediate point is common to the first and the second set;
  generating a first line from the primary point to the intermediate point and a second line from the intermediate point to the secondary point;
  generating a random number;
  replacing, in response to an even random number, the focus edge with the first line as the focus edge;
  replacing, in response to an odd random number, the focus edge with the second line as the focus edge; and
  repeating the identifying the first set, the identifying the second set, the selecting, the generating the first line and the replacing until a predetermined number (N) edges are selected or no more potential points exist to generate a line that is non-repeating and non-overlapping with the focus edge, any edges of user access pattern and any edges of the obfuscation pattern generated on each iteration.

6. The method of claim 1, wherein the generating of the obfuscation pattern further comprises:
  setting a line between the first point and the last point to represent a focus edge of the obfuscation pattern;
  identifying a first set of potential new points from a primary point of the focus edge, wherein a line between any point of the first set and the primary point is nonrepeating and non-overlapping with the focus edge and any edges of the user access pattern;
  identifying a second set of potential new points from a secondary point of the focus edge, wherein a line between any point of the second set and the secondary point is non-repeating and non-overlapping with the focus edge and any edges of the user access pattern;
  selecting an intermediate point from the first set and the second set, wherein the intermediate point is common to the first and the second set and the intermediate point;
  generating a first line from the primary point to the intermediate point and a second line from the intermediate point to the secondary point;
  replacing the focus edge with the first line or the second line as the focus edge; and
  repeating the identifying the first set, the identifying the second set, the selecting, the generating and the replacing until a predetermined number (N) edges are selected or no more potential points exist to generate a line that is non-repeating and non-overlapping with the focus edge, any edges of the user access pattern and any edges of the obfuscation pattern generated on each iteration.

7. The method of claim 1, further comprising:
sending the user access pattern and the obfuscation pattern to a server for further processing and storage.

8. A security system comprising:
a memory; and
a processor operable to:
  store a user access pattern;
  detect entry of the user access pattern on a matrix displayed on an unlock interface of a touchscreen of a touchscreen device;
  in response to determining that the user access pattern was entered correctly, unlocking the touchscreen and authenticating a user;
  generate an obfuscation pattern, after the user access pattern is stored, that is different from the user access pattern but is based upon the user access pattern, the processor, for generating the obfuscation pattern, is operable to:
    detect a first point and a last point of the user access pattern; and
    include, in the obfuscation pattern, one or more lines connecting the first point to the last point, the one or more lines forming a closed loop between the first point and the last point of the user access pattern, at least one of the one or more lines not overlapping with any edge of the user access pattern;
  display the obfuscation pattern on the touchscreen; and
  detect entry of the obfuscation pattern on the touchscreen to obfuscate a smudge left on the touchscreen from when the user was previously authenticated by entering the user access pattern on the touchscreen.

9. The security system of claim 8, wherein the processor, for detecting entry of the user access pattern, is operable to:
sense a sliding motion across an unlock interface at predetermined points of the matrix;
detect a cessation of the sliding motion for a predetermined period; and
record the predetermined points corresponding to the sensed sliding motion as the user access pattern.

10. The security system of claim 8, wherein the processor, for generating the obfuscation pattern, is further operable to:
set a line between the first point and the last point to represent a focus edge of the obfuscation pattern;
identify a first set of potential new points from the first point, wherein a line between any point of the first set and the first point is non-repeating and non-overlapping with the focus edge;
identify a second set of potential new points from the last point, wherein a line between any point of the second set and the last point is non-repeating and non-overlapping with the focus edge;
select an intermediate point from the first set and the second set, wherein the intermediate point is common to the first and the second set;
generate a first line from the first point to the intermediate point and a second line from the intermediate point to the last point;
replace the focus edge with the first line or the second line as the focus edge, wherein the intermediate point is a second point for the first line and the intermediate point is the first point for the second line; and
repeat the identify the first set, the identify the second set, the select the intermediate point and the generate until a predetermined number (N) edges are selected or no more potential points exist to generate a line that is non-repeating and non-overlapping with the focus edge, any edges of the user access pattern and any edges of the obfuscation pattern.

11. The security system of claim 8, wherein the processor, for displaying of the obfuscation pattern, is operable to:
highlight a first edge of the generated obfuscation pattern;
verify that the first edge has been actuated by a swipe action of the user; and
while all edges of the obfuscated pattern have not yet been verified as actuated, repeat the highlighting and the verifying for each successive edge of the obfuscation pattern.

12. The security system of claim 10, wherein the processor, for replacing the focus edge, is operable to:
generate a random number within a range of 1 to N where N is a number of edges in the generated obfuscation pattern; and
select, in response to the random number, a next edge from the edges in the generated obfuscation pattern.

13. The security system of claim 10, wherein the processor, for selecting the intermediate point, is operable to:
determine a set of points common to the first set and the second set; and
randomly select and designate a point from the set of points as the intermediate point.

14. The security system of claim 8, wherein the matrix is a N×N matrix, where N is a number of points in a row or a column in the unlock interface.

15. A non-transitory computer-readable medium including code for performing a method, the method comprising:
storing a user access pattern;
detecting entry of the user access pattern on a matrix displayed on an unlock interface of a touchscreen of a touchscreen device;
in response to determining that the user access pattern was entered correctly, unlocking the touchscreen and authenticating a user;
generating an obfuscation pattern, after the user access pattern is stored, that is different from the user access pattern but is based upon the user access pattern, the generating the obfuscation pattern comprising:
  detecting a first point and a last point of the user access pattern; and
  including, in the obfuscation pattern, one or more lines connecting the first point to the last point, the one or more lines forming a closed loop between the first point and the last point of the user access pattern, at least one of the one or more lines not overlapping with any edge of the user access pattern;
displaying the obfuscation pattern on the touchscreen; and
detecting entry of the obfuscation pattern on the touchscreen to obfuscate a smudge left on the touchscreen from when the user was previously authenticated by entering the user access pattern on the touchscreen.

16. The non-transitory computer-readable medium of claim 15, wherein the detecting entry of the user access pattern comprises:
sensing a sliding motion across an unlock interface at predetermined points of the matrix;
detecting a cessation of the sliding motion for a predetermined period; and
recording the predetermined points corresponding to the sensed sliding motion as the user access pattern.

17. The non-transitory computer-readable medium of claim 15, wherein the generating of the obfuscation pattern further comprises:
   setting a line between the first point and the last point to represent a focus edge of the obfuscation pattern;
   identifying a first set of potential new points from the first point, wherein a line between any point of the first set and the first point is non-repeating and non-overlapping with the focus edge and any edges of the user access pattern;
   identifying a second set of potential new points from the last point, wherein a line between any point of the second set and the last point is non-repeating and non-overlapping with the focus edge and any edges of the user access pattern;
   selecting an intermediate point from the first set and the second set, wherein the intermediate point is common to the first and the second set;
   generating a first line from the first point to the intermediate point and a second line from the intermediate point to the last point;
   replacing the focus edge with the first line or the second line as the focus edge, wherein the intermediate point is a second point for the first line and the intermediate point is the first point for the second line; and
   repeating the identifying the first set, the identifying the second set, the selecting, and the generating until a predetermined number (N) edges are selected or no more potential points exist to generate a line that is non-repeating and non-overlapping with the focus edge, any edges of the user access pattern and any edges of the obfuscation pattern generated on each iteration.

18. The non-transitory computer-readable medium of claim 15, wherein the displaying of the obfuscation pattern comprises:
   highlight a first edge of the generated obfuscation pattern;
   verify that the first edge has been actuated by a swipe action of the user; and
   while all edges of the obfuscated pattern have not yet been verified as actuated, repeating the highlighting and the verifying for each successive edge of the obfuscation pattern.

19. The non-transitory computer-readable medium of claim 17, wherein the replacing of the focus edge comprises:
   generate a random number within a range of 1 to N where N is a number of edges in the generated obfuscation pattern; and
   select, in response to the random number, a next edge from the edges in the generated obfuscation pattern.

20. The non-transitory computer-readable medium of claim 17, wherein the selecting of the intermediate point comprises:
   determine a set of common points that are common to the first set and the second set; and
   randomly select and designate a point from the set of common points as the intermediate point.

* * * * *